May 26, 1936.  C. C. FARMER  2,042,092
FLUID PRESSURE BRAKE
Filed April 27, 1935
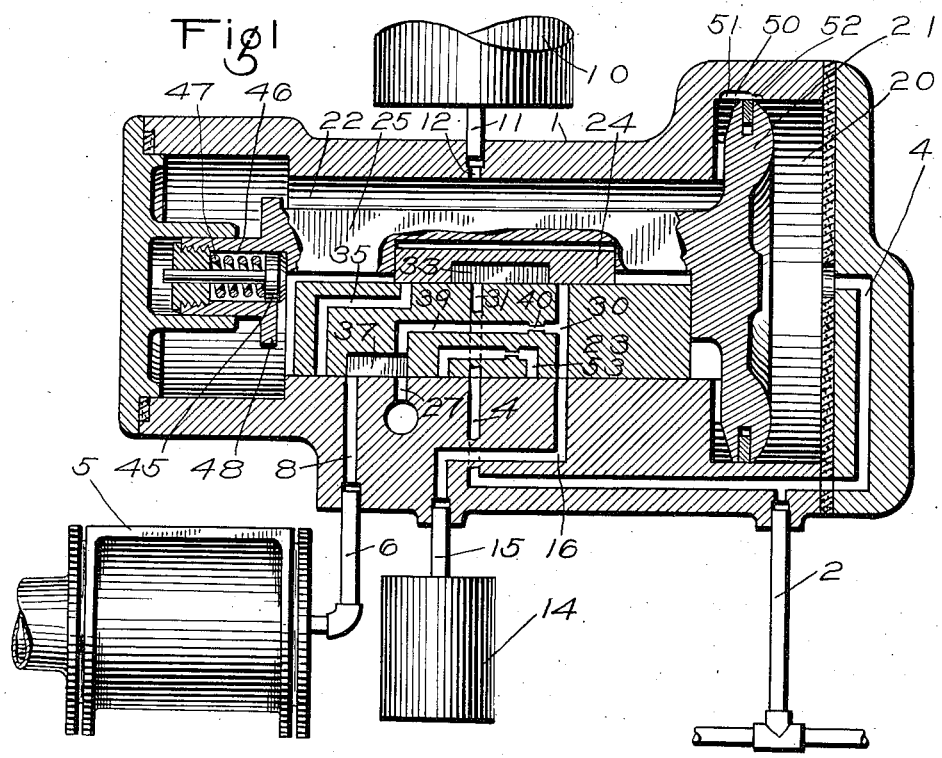
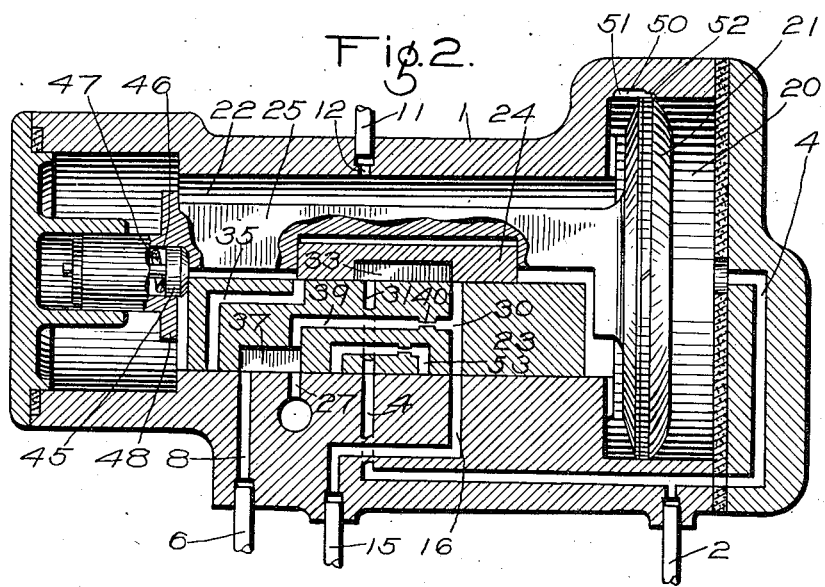
INVENTOR.
CLYDE C. FARMER
By Wm. M. Cady
ATTORNEY.

UNITED STATES PATENT OFFICE 2,042,092

FLUID PRESSURE BRAKE

Clyde C. Farmer, Pittsburgh, Pa., assignor to The Westinghouse Air Brake Company, Wilmerding, Pa., a corporation of Pennsylvania Application April 27, 1935, Serial No. 18,523

20 Claims. (Cl. 303—39)

This invention relates to fluid pressure brakes and more particularly to an automatic fluid pressure brake system in which the brakes are applied by reducing the brake pipe pressure and are released when the brake pipe pressure is increased.

In the operation of railway brake equipment, both in initially charging the equipment and in releasing the brakes, it is customary to supply fluid directly from the main reservoir to the brake pipe. After a time the supply of fluid to the brake pipe directly from the main reservoir is cut off and the brake pipe is supplied through a feed valve which automatically regulates the supply of fluid to the brake pipe so as to maintain a predetermined pressure in the brake pipe.

When fluid is supplied directly from the main reservoir to the brake pipe the reservoirs on the cars at the head end of the train, where the increase in brake pipe pressure is naturally very rapid, may be temporarily charged to a pressure above the normal pressure carried in the brake pipe.

As a result of this overcharge of the reservoirs on the cars at the head end of the train there is a possibility that when the pressure of the fluid in the brake pipe on the cars at the forward end of the train is reduced, due to equalization of the brake pipe pressure throughout the train, the difference in the pressure in the auxiliary reservoirs on these cars and in the brake pipe will cause the pistons of the brake controlling valve devices on these cars to move to the quick service position and thus vent fluid from the brake pipe.

If a piston does move to the quick service position and fluid is vented from the brake pipe, the resulting reduction in the pressure of the fluid in the brake pipe will cause the brake controlling valve device to move to the application position and effect an application of the brakes with the result that the brakes will be applied, which is, of course, objectionable.

It is the principal object of this invention to provide an improved brake controlling valve device which will not produce an application of the brakes as a result of an overcharge of the auxiliary reservoirs on the cars in the forward end of a train.

A further object of the invention is to provide an improved brake controlling valve device having an initial quick service position in which fluid under pressure is vented from the brake pipe, and having means to prevent the brake controlling valve device from moving to the quick service position as a result of pressure differences in the auxiliary reservoir and the brake pipe produced by an overcharge of the auxiliary reservoir.

Another object of the invention is to provide an improved brake controlling valve device having means to permit a flow of fluid from the auxiliary reservoir to the brake pipe whereby, in the event of an overcharge of the auxiliary reservoir, fluid can flow from the auxiliary reservoir to the brake pipe so as to equalize the pressures in the reservoir and the brake pipe and thereby prevent the brake controlling valve device from moving to an application position.

A further object of the invention is to provide an improved brake controlling valve device.

Other objects of the invention and features of novelty will be apparent from the following description taken in connection with the accompanying drawing in which Fig. 1 is a diagrammatic view of a fluid pressure brake equipment including a brake controlling valve device embodying my invention; and Fig. 2 is a diagrammatic sectional view of the brake controlling valve device provided by my invention showing the piston and graduating valve in a different position than they are shown in Fig. 1.

As shown in the drawing the equipment may comprise a brake controlling valve device having a casing 1, a brake pipe 2 which is connected to a passage 4 in the brake controlling valve device casing, a brake cylinder 5 connected by means of a pipe 6 to a passage 8, an auxiliary reservoir 10 connected by way of a pipe 11 to a passage 12, and a quick service reservoir 14 which is connected by a pipe 15 with a passage 16 in the casing of the brake controlling valve device.

The brake controlling valve device casing 1 has a piston chamber 20 connected to the brake pipe passage 4 and containing the piston 21, and on the opposite side of the piston is a valve chamber 22 connected to the auxiliary reservoir passage 12 and containing a main slide valve 23 and an auxiliary or graduating slide valve 24 adapted to be operated by the piston 21 through the medium of the piston stem 25.

The main slide valve 23 is movable upon a seat formed in the casing 1 and the seat has formed therein ports which communicate with the brake pipe passage 4, the brake cylinder passage 8, the quick service reservoir passage 16 and with an atmospheric exhaust passage 27.

The main slide valve has a plurality of ports extending therethrough and including a port 30, which, when the slide valve is in the release position, which is the position in which it is shown in Fig. 1 of the drawing, communicates with the quick service reservoir passage 16. Communication through this port is controlled by the graduating or auxiliary slide valve 24, which when the piston 21 is in the release position, cuts off communication through this passage.

The slide valve 23 also has a port 31 extending therethrough and adapted, when the slide valve is in the release position, to communicate with the brake cylinder passage 4, and with a cavity 33 formed in the graduating or auxiliary slide valve 24. The cavity 33 is designed to permit communication between the ports 31 and the port 30 in certain positions of the graduating valve, and when the valve is in the position in which it is shown in Fig. 1 of the drawing communication between these ports is cut off.

In addition the slide valve 23 has a service port 35 extending therethrough and adapted in the service position of the slide valve to communicate with the brake cylinder passage 8 and with the valve chamber 22. Communication between the valve chamber 22 and the port 35 is controlled by the graduating valve.

The slide valve 23 also has a cavity 37 formed therein, which when the slide valve is in the release position, is adapted to communicate with the brake cylinder passage 8 and with the atmospheric exhaust passage 27. The cavity 37 is connected with the port 30 by way of a branch passage 39 having a restricted portion 40 therein.

The piston stem 25 has a plunger 45 mounted in a bore 46 in the end of the stem and yieldingly urged to the right, as viewed in Fig. 1, by means of a spring 47. The plunger 45 is engageable with the end of the main slide valve 23 after a limited amount of movement of the piston 21 and piston stem 25 relative to the main slide valve. Upon further movement of the piston and the piston stem relative to the main slide valve 23 the plunger 45 is moved against the spring 47 until the shoulder 48 on the piston stem 25 engages the end of the main slide valve 23, and on further movement of the piston and piston stem, the slide valve 23 is moved on its seat.

The casing 1 has a feed groove or feed communication formed therein and indicated generally by the reference numeral 50. The feed groove, when the piston is in the release position as shown in Fig. 1 of the drawing, extends around the piston so as to permit communication between the valve chamber 22 and the piston chamber 20, and is provided with portions of unequal size or flow area. These include a portion of relatively large size or flow area indicated by the numeral 51 and positioned adjacent the valve chamber 22, and a portion of relatively small size or flow area indicated at 52 and positioned remote from the valve chamber 22. The feed groove 50 is of such length, and is positioned so that when the piston 21 is in the release position as shown in Fig. 1 of the drawing, communication between the piston chamber 20 and the valve chamber 22 and therefrom to the auxiliary reservoir 10, is permitted through the relatively large portion 51 so that the auxiliary reservoir may be charged at a relatively rapid rate. The feed groove is also proportioned so that when the piston 21 is moved to the right as viewed in Fig. 1, a distance sufficient to move the plunger 45 into engagement with the end of the slide valve 23, the piston will cut off communication through the relatively large portion 51 of the feed groove, but will permit communication through the relatively small portion 52 of the feed groove, so that in the event of an overcharge of the auxiliary reservoir fluid under pressure can flow from the valve chamber 22 to the piston chamber 20 so that pressure in the auxiliary reservoir and in the brake pipe 2 may equalize.

When the piston 21 is moved from the position in which communication is permitted through the relatively large portion of the feed groove to the position in which communication is permitted through the relatively small portion of the feed groove, the graduating or auxiliary slide valve 24 is moved relative to the main slide valve 23, and the cavity 33 in the auxiliary or graduating valve 24 is arranged so that this amount of movement of the graduating valve is insufficient to effect communication between the passages 31 and 30.

In the operation of the brake controlling valve device provided by this invention, when the brakes are released by the supply of fluid under pressure to the brake pipe 2, the piston 21, the main slide valve 23, and the graduating valve 24 are moved to the position in which they are shown in Fig. 1 of the drawing, in which position the relatively large portion 51 of the feed groove 50 is open so that fluid may flow from the brake pipe 2 by way of the passage 4 and the piston chamber 20 to the valve chamber 22 and therefrom to the auxiliary reservoir 10 to charge this reservoir. At the same time the quick service reservoir 14 is connected to the atmosphere by way of passage 16, the port 30 in the main slide valve, and the branch port 39 which communicates with the cavity 37 and therefrom with the atmospheric exhaust passage 27. At the same time communication between the brake pipe passage 4 and the passage 30 is cut off by means of the graduating or auxiliary valve 24.

If the pressure in the auxiliary reservoir is built up to a value above that normally carried in the brake pipe and the brake pipe pressure is thereafter reduced to the normal pressure, a pressure difference will be established between the valve chamber 22 and the piston chamber 20, and the piston 21 will be caused to move away from the release position towards the application position.

After a limited amount of movement of the piston towards the application position, the plunger 45 will engage the end of the slide valve 23 so as to resist further movement of the piston. This plunger and the spring 47 are arranged so as to hold the piston in the position in which it is shown in Fig. 2 of the drawing unless the differential pressure between the auxiliary reservoir pressure and the brake pipe pressure as created by the reduction in brake pipe pressure is sufficient to overcome the resisting force of the spring 47, in which position the relatively small portion 52 of the feed groove 50 is open, thereby permitting fluid to flow between the valve chamber 22 and the piston chamber 20 so that the pressure of the fluid in the auxiliary reservoir 10 may reduce to the brake pipe pressure.

At the same time the graduating valve 24 is maintained in a position so as to not establish communication between the port 31, which communicates with the brake pipe passage 4, and the port 30, which communicates with the quick service reservoir 14 and with the atmosphere, so that movement of the piston 21 as a result of a pressure differential on opposite sides of the piston created by an overcharge of the auxiliary reservoir does not result in venting of fluid from the brake pipe to the quick service reservoir and to the atmosphere.

The portion 52 of the feed groove, which is of relatively small size or flow area, is proportioned so that it is of sufficient capacity to permit fluid to flow between the valve chamber and the brake pipe rapidly enough to enable the pressure of the fluid in the reservoir to equalize with that in the brake pipe when the pressure of the fluid in the brake pipe is reduced due to equalization of the pressure in the brake pipe throughout the train, but this portion of the feed groove is not large enough to permit fluid to flow from the valve chamber to the brake pipe rapidly enough so that the pressure in the reservoir reduces so as to equalize with that in the brake pipe when the pressure of the fluid in the brake pipe is reduced at a service rate to produce an application of the brakes.

If a greater pressure differential is created upon the piston 21 as a result of a reduction in the pressure of the fluid in the brake pipe 2 for the purpose of applying the brakes, the piston 21 will move farther to the right and the plunger 45 will be moved against the spring 47 until the shoulder 48 engages the end of the main slide valve 23. As a result of this movement of the piston the graduating or auxiliary slide valve 24 will be moved to a position in which communication is permitted between the ports 31 and 30 and fluid will be vented from the brake pipe 2 by way of the passage 4, the port 31, the cavity 33, the port 30 and the passage 16 to the quick service reservoir 14, and from the passage 30 through the restricted communication 40 and the passage 39 to the atmospheric passage 27. The local reduction in brake pipe pressure produced by venting of fluid from the brake pipe to the atmosphere, and to the quick service reservoir will cause the piston 21 to move to the application position, in which position fluid under pressure is supplied from the valve chamber 22 to the brake cylinder 5 by way of the service port 35 and the brake cylinder passage 8, so as to effect an application of the brakes. In this position fluid under pressure is vented from the brake pipe to the quick service reservoir 14 by way of passage 4, a restricted cavity 53 in the main slide valve, passage 16 and pipe 15.

As the brake controlling valve device provided by my invention has means yieldingly opposing movement of the piston to a position in which the feed groove is closed, and in which communication is initially established between the quick service reservoir and the brake pipe, the piston will not move to this position as the result of pressure differentials created on the piston by overcharging of the auxiliary reservoir, and undesired movement of the brake controlling valve device to application position, as a result of this condition will not be effected.

While one embodiment of the improved brake controlling valve device provided by my invention has been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In a fluid pressure brake, in combination, a brake pipe, a reservoir, and a brake controlling valve device comprising a main valve, an auxiliary valve having movement relative to the main valve, a piston subject to the opposing pressures of the reservoir and the brake pipe, a feed communication through which fluid under pressure is supplied from the brake pipe to the reservoir and adapted to be closed by movement of the piston toward a brake applying position, means operative by movement of the auxiliary valve relative to said main valve by said piston on movement of the piston to a position to close the feed communication for venting fluid under pressure from the brake pipe, and means yieldingly opposing movement of the piston to said feed communication closing position.

2. In a fluid pressure brake, the combination with a brake pipe, a reservoir, a brake controlling valve device comprising a casing, a piston mounted in said casing, a chamber at one side of the piston open to said reservoir, a chamber at the other side of the piston open to said brake pipe, a feed communication around the piston through which fluid flows between the reservoir and the brake pipe and controlled by said piston, the piston being movable between a position in which the flow of fluid through the feed communication is permitted at a rapid rate and a position in which the flow of fluid through the feed communication is cut off, and having an intermediate position in which the flow of fluid through the feed communication is permitted at a restricted rate, and resilient means yieldingly opposing movement of the piston from the intermediate position to the position in which the flow of fluid through the feed communication is cut off.

3. In a fluid pressure brake, in combination, a brake pipe and a triple valve device comprising a main valve, an auxiliary valve having movement relative to the main valve, a piston operated upon a reduction in brake pipe pressure for operating said valves, a feed communication around said piston through which fluid under pressure is adapted to flow to and from the reservoir and which is adapted to be closed upon movement of said piston, and resilient means for yieldingly opposing movement of said piston to its feed communication closing position.

4. In a fluid pressure brake, in combination, a brake pipe, a reservoir, and a brake controlling valve device comprising a main valve, an auxiliary valve having movement relative to the main valve, a movable abutment subject to the opposing pressures of the reservoir and the brake pipe for operating said valves, a supply passage through which fluid under pressure flows between the brake pipe and the reservoir, the movable abutment controlling communication through said passage, means for venting fluid under pressure from the brake pipe and operative by movement of the auxiliary valve relative to the main valve on movement of the abutment to a position to close the supply passage, and means yieldingly opposing movement of the abutment to the position in which communication through said supply passage is cut off.

5. In a fluid pressure brake, in combination, a brake pipe, a reservoir, and a brake controlling valve device comprising a valve member, a movable abutment subject to the opposing pressures of the reservoir and the brake pipe for operating said valve member, a supply passage through which fluid under pressure flows between the brake pipe and the reservoir, the movable abutment controlling communication through said passage, means for venting fluid under pressure from the brake pipe and operative by movement of the valve member by said abutment on movement of the abutment to a position to close the supply passage, and means yieldingly opposing movement of said abutment to said supply passage closing position.

6. In a fluid pressure brake, in combination, a brake pipe, a reservoir, and a brake controlling valve device comprising a main valve, an auxiliary valve having movement relative to the main valve, a piston subject to the opposing pressures of the reservoir and the brake pipe, the valves being operated by said piston, a feed communication around the piston through which fluid under pressure flows between the brake pipe and the reservoir, the feed communication having portions of unequal flow area and including a portion of relatively large flow area and a portion of relatively small flow area, the portion of relatively large flow area being closed upon initial movement of the piston, the portion of relatively small flow area being closed on further movement of the piston, means controlled by the auxiliary valve and operative on movement of the said valve by the piston on said further movement of the piston for venting fluid under pressure from the brake pipe, and means for yielding opposing movement of the piston to close communication through the portion of the feed communication of small flow area.

7. In a fluid pressure brake, in combination, a brake pipe, a reservoir, and a brake controlling valve device comprising a main valve, an auxiliary valve having movement relative to the main valve, a piston subject to the opposing pressures of the reservoir and the brake pipe, the valves being operated by said piston, a feed communication around the piston through which fluid under pressure flows between the brake pipe and the reservoir, the feed communication having portions of unequal flow area and including a portion of relatively large flow area and a portion of relatively small flow area, the portion of relatively large flow area being closed upon initial movement of the piston, the portion of relatively small flow area being closed on further movement of the piston, means controlled by the auxiliary valve and operative on movement of said valve relative to the main valve by the piston on said further movement of the piston for venting fluid from the brake pipe, and means yieldingly opposing movement of the auxiliary valve relative to the main valve on movement of the piston to close communication through the portion of the feed communication of small flow area.

8. In a fluid pressure brake, in combination, a brake pipe, a reservoir, and a brake controlling valve device comprising a main valve, an auxiliary valve, a piston subject to the opposing pressures of the reservoir and the brake pipe for operating the valves, the piston and the auxiliary valve being movable relative to the main valve, a feed communication around the piston through which fluid under pressure flows between the reservoir and the brake pipe, the feed communication having portions of unequal flow area and including a portion of relatively large flow area and a portion of relatively small flow area, the portion of relatively large flow area being closed upon initial movement of the piston relative to the main valve, the portion of relatively small flow area being closed on further movement of the piston relative to the main valve, means controlled by the auxiliary valve and operative by movement of said valve relative to the main valve by the piston on said further movement of the piston to vent fluid under pressure from the brake pipe, and means yieldingly opposing movement of the piston relative to the main valve to close communication through the portion of the feed communicaion of small flow area.

9. In a fluid pressure brake, in combination, a brake pipe, a reservoir, and a brake controlling valve device comprising a main valve, an auxiliary valve, a piston subject to the opposing pressures of the reservoir and the brake pipe for operating said valves, the piston and the auxiliary valve being movable relative to the main valve, a feed communication around the piston through which fluid under pressure flows between the reservoir and the brake pipe and adapted to be closed by the piston by movement of the piston relative to the main valve, means operated by movement of the auxiliary valve relative to the main valve by movement of the piston relative to the main valve for venting fluid from the brake pipe, and means yieldingly opposing movement of the piston to the feed communication closing position.

10. In a fluid pressure brake, in combination, a brake pipe, a reservoir, and a brake controlling valve device comprising a valve element, a piston subject to the opposing pressures of the reservoir and the brake pipe for operating said valve element, the piston being movable relative to said valve element, a feed communication around the piston through which fluid under pressure flows between the reservoir and the brake pipe and adapted to be closed by the movement of the piston relative to the valve element, and resilient means yieldingly opposing movement of the piston to the feed communication closing position.

11. In a fluid pressure brake, in combination, a brake pipe, a reservoir, and a brake controlling valve device comprising a valve element, a piston subject to the opposing pressures of the reservoir and the brake pipe for operating said valve element, the piston being movable relative to said valve element, a feed communication around the piston through which fluid under pressure flows between the reservoir and the brake pipe and adapted to be closed by the movement of the piston relative to the valve element, the feed communication having portions of unequal flow area and including a portion of relatively large flow area adapted to be closed upon initial movement of the piston relative to the valve element, and a portion of relatively small flow area adapted to be closed upon further movement of the piston relative to the valve element, and resilient means yieldingly opposing said movement of the piston to close communication through the portion of the feed communication of relatively small flow area.

12. In a fluid pressure brake, in combination, a brake pipe, a reservoir, and a brake controlling valve device comprising a valve element, a piston subject to the opposing pressures of the reservoir and the brake pipe for operating said valve element, the piston being movable relative to said valve element, a feed communication around the piston through which fluid under pressure flows between the reservoir and the brake pipe and adapted to be closed by the movement of the piston relative to the valve element, the feed communication having portions of unequal flow area and including a portion of relatively large flow area adapted to be closed upon initial movement of the piston relative to the valve element, and a portion of relatively small flow area adapted to be closed upon further movement of the piston relative to the valve element, means yieldingly opposing said movement of the piston to close communication through the portion of the feed communication of relatively small flow area, and means operative on movement of the piston to a position to close communication through the portion of the feed communication of relatively small flow area for venting fluid from the brake pipe.

13. In a fluid pressure brake, in combination, a brake pipe, a reservoir, and a brake controlling valve device comprising a valve element, a piston subject to the opposing pressures of the reservoir and the brake pipe for operating said valve element, the piston being movable relative to said valve element, a feed communication around the piston through which fluid under pressure flows between the reservoir and the brake pipe and adapted to be closed by movement of the piston relative to the valve element, the feed communication having portions of unequal flow area and including a portion of relatively large flow area adapted to be closed upon initial movement of the piston relative to the valve element, and a portion of relatively small flow area adapted to be closed upon further movement of the piston relative to the valve element, and means yieldingly opposing movement of the piston relative to the valve element to close communication through the portion of the feed communication of small flow area and operable only after the piston has moved to a position to close the portion of the feed communication of relatively large flow area.

14. In a fluid pressure brake, in combination, a brake pipe, a reservoir, and a brake controlling valve device comprising a valve element, a piston subject to the opposing pressures of the reservoir and the brake pipe for operating said valve element, the piston being movable relative to said valve element, a feed communication around the piston through which fluid under pressure flows between the reservoir and the brake pipe and adapted to be closed by movement of the piston relative to the valve element, the feed communication having portions of unequal flow area and including a portion of relatively large flow area adapted to be closed upon initial movement of the piston relative to the valve element, and a portion of relatively small flow area adapted to be closed upon a further movement of the piston relative to the valve element, means yieldingly opposing movement of the piston relative to the valve element to close communication through the portion of the feed communication of small flow area and operable only after the piston has moved to a position to close the portion of the feed communication of relatively large flow area, and means operative on said movement of the piston to a position to close communication through the portion of the feed communication of small flow area for venting fluid from the brake pipe.

15. In a fluid pressure brake, in combination, a brake pipe, a reservoir, and a brake controlling valve device comprising a piston subject to the opposing pressures of the reservoir and the brake pipe, a main valve and an auxiliary valve having movement relative to the main valve, a piston stem carried by said piston for operating said valves, a feed communication around the piston through which fluid flows between the reservoir and the brake pipe and adapted to be closed by movement of the piston relative to the main valve, means operative by movement of the auxiliary valve relative to the main valve by movement of the piston relative to the main valve for venting fluid under pressure from the brake pipe, and means cooperating with said piston stem and with said main valve for yieldingly opposing movement of the piston to said feed communication closing position.

16. In a fluid pressure brake, in combination, a brake pipe, a reservoir, and a brake controlling valve device comprising a piston subject to the opposing pressures of the reservoir and the brake pipe, a main valve and an auxiliary valve having movement relative to the main valve, a piston stem carried by said piston for operating said valves, a feed communication around the piston through which fluid flows between the reservoir and the brake pipe and adapted to be closed by movement of the piston relative to the main valve, means operative by movement of the auxiliary valve relative to the main valve by movement of the piston relative to the main valve for venting fluid under pressure from the brake pipe, and a spring carried by said piston stem for yieldingly opposing said movement of the piston to said feed communication closing position.

17. In a fluid pressure brake, in combination, a brake pipe, a reservoir, and a brake controlling valve device comprising a piston subject to the opposing pressures of the reservoir and the brake pipe, a main valve and an auxiliary valve having movement relative to the main valve, a piston stem carried by said piston for operating said valves, a feed communication around the piston through which fluid flows between the reservoir and the brake pipe and adapted to be closed by movement of the piston relative to the main valve in one direction, means operative by movement of the auxiliary valve relative to the main valve by movement of the piston relative to the main valve in said one direction for venting fluid under pressure from the brake pipe, and means cooperating with the piston stem and with the main valve for yieldingly opposing movement of the piston relative to the main valve to close the feed communication.

18. In a fluid pressure brake, in combination, a brake pipe, a reservoir, and a brake controlling valve device comprising a piston subject to the opposing pressures of the reservoir and the brake pipe, a main valve and an auxiliary valve having movement relative to the main valve, a piston stem carried by said piston for operating said valves, a feed communication around the piston through which fluid flows between the reservoir and the brake pipe and adapted to be closed by movement of the piston relative to the main valve in one direction, means operative by movement of the auxiliary valve relative to the main valve by movement of the piston relative to the main valve in said one direction for venting fluid under pressure from the brake pipe, and a spring carried by said piston stem and yieldingly opposing movement of the piston relative to the main valve in said one direction to close the feed communication.

19. In a fluid pressure brake, the combination with a brake pipe, a reservoir, a brake controlling valve device comprising a casing, a piston mounted in said casing, a chamber at one side of the piston open to said reservoir, a chamber at the other side of the piston open to said brake pipe, said piston being movable upon a reduction in brake pipe pressure to one position and upon an increase in brake pipe pressure to another position, a feed communication adapted to connect said chambers and controlled by said piston, the piston being adapted in the last mentioned position to open said communication to permit the flow of fluid between said chambers, and being adapted in the other position to close said communication, and resilient means cooperating with said piston after a predetermined movement of the piston to prevent movement of the piston to close said communication unless the rate of reduction in brake pipe pressure exceeds the rate of flow of fluid through the communication from the reservoir to the brake pipe.

20. In a fluid pressure brake, the combination with a brake pipe, a reservoir, a brake controlling valve device comprising a casing, a piston mounted in said casing and having at one side a chamber open to said brake pipe and at the opposite side a chamber open to said reservoir, said piston being movable upon a reduction in brake pipe pressure to one position and upon an increase in brake pipe pressure to another position, said casing having a feed groove controlled by said piston, said piston being operative in the last mentioned position to open communication through said feed groove from said brake pipe to said reservoir through which fluid under pressure is supplied from said brake pipe to said reservoir, and being operative upon a reduction in brake pipe pressure at a certain or greater rate to close said communication, and resilient pressure exerting means disposed in said casing operative to oppose movement of said piston to close said communication and designed in accordance with the flow capacity of said feed groove to prevent closure of said communication when the rate of reduction in brake pipe pressure is less than said certain rate.

CLYDE C. FARMER.